COLOR TELEVISION SYNCHRONIZATION

Filed March 20, 1953

INVENTOR.

Richard W. Sonnenfeldt

BY [signature]

ATTORNEY

United States Patent Office 2,873,311

Patented Feb. 10, 1959

2,873,311

COLOR TELEVISION SYNCHRONIZATION

Richard W. Sonnenfeldt, Haddonfield, N. J., assignor to Radio Corporation of America, a corporation of Delaware Application March 20, 1953, Serial No. 343,757

9 Claims. (Cl. 178—5.4)

This invention relates to color television receivers and more particularly to the separation of the color synchronizing burst from a composite color television signal.

Modern color television systems employ a transmitted burst of a synchronizing frequency to maintain a fixed and precise relation between the modulation at the transmitter and the demodulation at the receiver. The burst is positioned upon the back porch of the horizontal blanking signal in accordance wtih a specification adopted by the National Television Standards Committee, Panel 14, on May 20, 1952. The burst is used as a reference frequency with which the frequency of the receiver's local demodulating oscillator is compared. Should there be a difference either in phase or frequency between the burst and the frequency of the local oscillations an error voltage is derived by appropriate means to correct the local oscillation frequency until equality of phase and frequency is again achieved.

A fuller description of the burst function and operation may be found in the February 1952 issue of "Electronics" at page 96.

It is apparent that if the burst envelope is distorted resulting in phase flutter its value as a reference frequency and phase with which to compare the local oscillator frequency and phase is considerably diminished. Previous circuitry employing tuned circuits to assist in obtaining noise immunity have had the concomitant disadvantage of introducing a certain amount of envelope and consequently phase distortion. These arose by virtue of the transient response characteristics of such tuned circuits to an injection of a suddenly applied sine wave of short duration such as burst. While dispensing with such tuned circuits may somewhat ameliorate this condition, their absence makes the possibility of rejection of unwanted noise frequencies remote.

A principle object of this invention is to provide means for overcoming the undesirable effects of such tuned circuits so as to reduce the phase distortion, especially in connection with modern color television receivers.

More specifically, an object of the invention is to provide a means for reduction of phase distortion introduced by the transient response of tuned circuits in burst separation circuits employed in color television receivers.

According to the invention the output signal of the tuned circuit is rectified during the time that the burst is gated out and then the rectified burst is clipped to a constant depth so as to reduce phase shift.

A more detailed and functional explanation of my invention will be given in connection with the accompanying drawing in which.

Figures 1, 2:
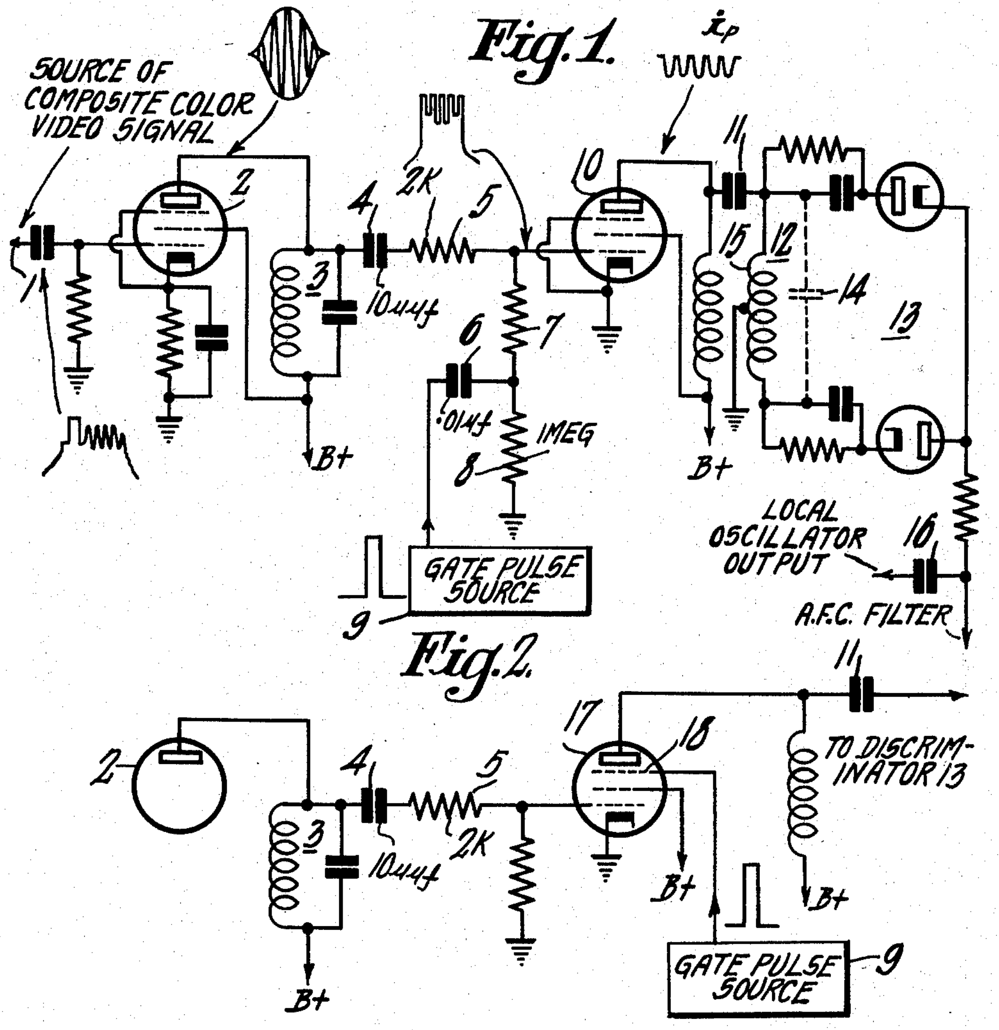
Figure 1 is a circuit of one embodiment of the invention.
Figure 2 is an alternative form of the invention.

Heretofore, methods of burst separation have employed a tank circuit in the output circuit of a video amplifier stage to which the composite color signal has been fed.

This afforded a good measure of noise immunity, but when the burst was taken off across the tank circuit terminals it had an envelope of varying amplitude which tapered at its beginning and end. This changing amplitude of the burst caused a non-uniform phase shift throughout the duration of the burst signal. If the complete envelope was then gated out by the application of a pulse to an electrode of a gating tube a burst with a large amount of average phase shift would appear at one input of a phase comparator. Thus if the local sampling oscillator output was fed to the other input of the phase comparator an incorrect error voltage would be derived which in turn would fail to bring the local oscillator to the desired phase and frequency.

Referring to Figure 1, the composite color video signal containing the blanking pulses, horizontal and vertical synchronizing pulses, color video information and burst signal is derived from a source 1 of said signals and fed to the control grid of pentode video amplifier tube 2. The amplified output appears across tank circuit 3 connected in its plate circuit, the tank being resonant to the burst frequency 3.89 mc., 3.85 mc. or other designated frequency. The burst component of the amplified and filtered composite wave appearing across the tank circuit 3 at the plate of tube 2 has an envelope which is illustrated as having a tapered beginning and end due to the transient response of the tank circuit 3. The burst is coupled via condenser 4 and resistor 5 in series to the input electrode of tube 10. Simultaneously a gate pulse is applied from source 9 via condenser 6 and resistor 7 to the same input electrode. The time constant of condenser 4, resistor 5 and resistor 7 is so short that no charge is maintained upon condenser 6 in the interval between cycles of burst and peak charging of condenser 6 is eliminated. The time constant of condenser 4 and resistor 5 is such that extraneous signals cannot cut off the tube 10. However, the time constant of condenser 6 and resistor 8 is so long that there is a storage of charge on condenser 6 between gate pulses. Tube 10 employs self-bias, clamping being effected between its control grid and ground so that the top of the gate pulse coincides wtih the axis of the burst. This results in a rectification of the burst since the grid draws current at the top of each gate so that only the negative half-cycles are amplified by tube 10. The gate pulse is positive and the rectified burst appears on top of it as shown at the control grid of tube 10. At the plate of tube 10 the negative half-cycles of current are shown. Their negative amplitude has been clipped to a constant but very limited level close to and parallel to the axis of the burst. Since the clipping level is so shallow it may be seen that practically all the cycles of the burst are included and have the same amplitude. This negative clipping is accomplished by choosing the tube 10 screen and plate parameters such that tube 10 is cut off at this point. If tube 10, for example, is a 6AH6 the screen potential might be at 60 or 70 volts and the plate proportionately higher. It is thus apparent that there are no large variations in current present in the output of tube 10 as shown and that the average phase shift is considerably reduced and is uniform from burst to burst. These negative half-cycles of current are fed via condenser 11 to the tank circuit 12 of discriminator 13. The tank circuit 12 includes inductance 15 and capacitance 14 which may be the distributed capacity of the inductance 15. Since the tank circuit 12 is tuned to the fundamental content of these negative half-cycles, they are restored to full sine waves having the burst frequency and the output appears across condenser 16 which leads to the local sampling oscillator output and to the A. F. C. filter. Discriminator 13 as shown is a push-pull phase discriminator but other types of suitable phase discriminators generally employed in color television local oscillator frequency control can alternatively be used.

Figure 2 illustrates a form of the invention wherein constant depth clipping is employed. The positive half-cycles of the burst are clipped from the signal and do not appear in the output signal which is fed to discriminator 13. The output of tube 2, to which the complete composite color video signal has been fed is passed through tank circuit 3. Tank circuit 3 filters out essentially all frequency components in the neighborhood of the burst frequency. The resulting double tapered waveform signal derived from the burst is coupled via condenser 4 and resistor 5 to the input electrode of tube 17. Tube 17 may take the form of a 6AS6. In this form of the invention the gate pulse occurring during the back porch interval is not fed to the input electrode of tube 17 but rather is applied to suppressor grid 18 to gate out the rectified and clipped negative half-cycles. The latter half-cycles are then fed via condenser 11 to discriminator 13 which restores the complete sine wave at the burst frequency. Any video power tube, as for example, a 6CB6, may also be employed in place of the 6AS6 providing the gating is done at the screen grid. More power is required, however, when screen grid gating is utilized.

Having thus described my invention, what is claimed is:

1. Apparatus for reducing the effects of phase and amplitude distortion introduced when a burst of a signal having a designated frequency is applied to a tuned circuit resonant to said frequency, said apparatus including means coupled to said tuned circuit for rectifying said burst of signal and for clipping said rectified burst at a relatively low level of amplitude, and frequency responsive means coupled to said rectifying and clipping means for reconstituting said burst.

2. Apparatus for reducing the effects of phase and amplitude distortion introduced when a burst of a signal having a designated frequency is applied to a tuned circuit resonant to said frequency comprising means coupled to said tuned circuit for detecting only the negative half-cycles of said burst and for clipping said negative half-cycles at a relatively low level of amplitude, and frequency resonant means coupled to said rectifying and clipping means for reconstituting said burst.

3. In a color television receiver adapted to receive a television signal including color synchronizing bursts which occur during each retrace interval, said bursts having prescribed phase and frequency; the combination of: a first circuit to develop said bursts; an electron tube circuit having an input electrode and an output electrode; means for applying said bursts from said first circuit to said input electrode; means for biasing said electron tube circuit to rectify said bursts applied to said input electrode; means to apply a voltage of prescribed magnitude to said output electrode whereby amplitude-limited rectified bursts are produced at said output electrode; and means coupled to said output electrode and responsive to said amplitude-limited rectified bursts to reconstitute said bursts.

4. In a color television receiver adapted to receive a signal wherein a color synchronizing burst occurs during a prescribed portion of each retrace interval, said burst having a prescribed frequency and phase, the combination of: an electron discharge device having an input electrode and an output electrode, means for biasing said electron discharge device to produce negative half cycles at said output electrode of any alternating current wave applied to said input electrode, means to apply said bursts to said input electrode whereby negative half cycles of said bursts are developed at said output electrodes, means coupled to said electron discharge device to control conduction through said discharge device to limit the voltage swing of said negative half cycles of said burst at said output electrode to a predetermined level, and resonant circuit means tuned to the frequency of said burst and coupled to said output electrode for reconstituting said burst.

5. In a color television receiver adapted to receive a signal wherein a color synchronizing burst occurs during a prescribed portion of each retrace interval, said burst having a prescribed frequency and phase, the combination of: an electron discharge device having an input electrode and an output electrode, means for biasing said electron discharge device to produce negative half cycles at said output electrode of any alternating current wave applied to said input electrode, means to apply said bursts to said input electrode whereby negative half cycles of said bursts are developed at said output electrodes, means coupled to said electron discharge device to cause said discharge device to be operative only during said bursts, and resonant circuit means tuned to the frequency of said burst and coupled to said output electrode for reconstituting said burst.

6. In a color television receiver adapted to receive a color television signal wherein occur color synchronizing bursts during each retrace interval, the combination of: an electron tube having a control grid and an anode, means including a resistance-capacitance circuit for applyign said bursts to said control grid, means coupled to said control grid to apply thereto pulses of positive polarity which occur during said bursts to render said electron tube conductive only during said bursts and to cause said tube to draw current to said control grid during the application of the positive half cycles of said bursts thereto to produce negative half cycles of said bursts at said anode, means to apply a voltage in a predetermined voltage range to said anode to limit the amplitude of the negative half cycles of said bursts developed at said anode to a predetermined voltage, and means coupled to said anode and responsive to said amplitude-limited negative half cycles of said bursts to develop an alternating current wave having a frequency and phase related to the frequency and phase of said bursts.

7. In a color television receiver adapted to receive a color television signal wherein color synchronizing bursts occur during each retrace interval, the combination of: an electron tube having a control grid and an anode, means to apply said bursts in a predetermined range of amplitude to said control grid, means for applying a gating pulse to said control grid simultaneously with the application of said bursts to bias said tube to draw current to said control grid during the occurrence of the positive half cycles of said bursts and producing a current representative of negative half cycles of said bursts at said anode, means to apply a voltage in a voltage range to said anode to limit the amplitude of the current representative of said negative half cycles of said burst developed at said anode to a predetermined voltage, and means coupled to said anode and responsive to said current representative of said amplitude-limited negative half cycles of said burst developed thereat to develop an alternating current wave having a frequency and phase related to the frequency and phase of said burst.

8. In combination: a first circuit to provide bursts of an alternating current signal having a prescribed frequency and phase and intermittently occurring during predetermined time intervals, a second circuit, an electron discharge device having an input electrode and an output electrode, means for biasing said discharge device to rectify an alternating current signal applied to said input electrode, means coupling said first circuit and said input electrode to apply said bursts to said input electrode whereby rectified bursts are developed at said output electrode, means coupled to said output electrode to apply a voltage of prescribed magnitude to said output electrode for limiting the amplitude of said rectified bursts, means coupled to said electron discharge device to apply pulses which occur during the time intervals during which said bursts occur to said electron discharge device to render said electron discharge device operative only during the time intervals when said bursts occur, a resonant circuit means tuned to the frequency of said bursts and coupled to said output electrode and responsive to the amplitude limited rectified bursts developed thereat to develop an alternating current wave having a frequency and phase prescribed by said amplitude limited rectified burst.

9. In a color television receiver adapted to receive a color television signal wherein occur intermittent color synchronizing bursts having a burst frequency and phase, the combination of: an electron tube having a first and second control electrode and an anode, circuit means operatively connected to said electron tube to cause an alternating current voltage applied to said first control electrode to produce current variations representing negative half cycles of said alternating current voltage, said current variations having an intensity controllable in accordance with the magnitude of a control voltage applied to said second control electrode, means to apply said bursts to said first control electrode, means to apply a control voltage of prescribed magnitude to said second control electrode during each burst to develop current variations representative of negative half-cycle of said bursts with amplitudes limited to a prescribed amplitude at said anode, and means coupled to said anode and responsive to said current representative of amplitude-limited negative half cycles of said bursts to develop an alternating current wave having burst frequency.

References Cited in the file of this patent

UNITED STATES PATENTS 2,586,957 Keizer ---------------- Feb. 26, 1952